United States Patent [19]

Frantz et al.

[11] Patent Number: 4,823,304

[45] Date of Patent: Apr. 18, 1989

[54] METHOD OF PROVIDING SYNCHRONOUS MESSAGE EXCHANGE IN AN ASYCHRONOUS OPERATING ENVIRONMENT

[75] Inventors: Billy J. Frantz, Clontarf, Australia; Sven E. Hellstrom, Vallingby, Sweden

[73] Assignee: International Business Machines Incorporated, Armonk, N.Y.

[21] Appl. No.: 3,444

[22] Filed: Jan. 15, 1987

[51] Int. Cl.[4] .......................... G06F 7/00; G06F 7/38; G06F 9/00; G06F 15/16
[52] U.S. Cl. ..................................... 364/900; 364/300
[58] Field of Search ... 364/200 MS File, 900 MS File, 364/300; 379/96; 370/91, 95, 100; 235/375-385

[56] References Cited

U.S. PATENT DOCUMENTS

| | | | |
|---|---|---|---|
| 4,213,190 | 7/1980 | Finlay et al. | 364/900 |
| 4,247,894 | 1/1981 | Beismann et al. | 364/200 |
| 4,257,096 | 3/1981 | McCullough et al. | 364/200 |
| 4,318,182 | 3/1982 | Bachman et al. | 364/200 |
| 4,369,494 | 1/1983 | Bienvenu et al. | 364/200 |
| 4,395,757 | 7/1983 | Bienvenu et al. | 364/200 |
| 4,410,940 | 10/1983 | Carlson et al. | 364/200 |
| 4,445,197 | 4/1984 | Lorie et al. | 364/900 |
| 4,636,947 | 1/1987 | Ward | 364/200 |
| 4,642,756 | 2/1987 | Sherrod | 364/200 |
| 4,660,168 | 4/1987 | Gant et al. | 364/900 |

OTHER PUBLICATIONS

Sippl et al., "Computer Dictionary and Handbook", Howard W. Sams & Co., Inc., Indiana (1980) pp. 27, 542, 543.
Weik, M., "Standard Dictionary of Computers and Information Processing.", Hayden Book Company, Inc., New York (1969) pp. 29, 206, 209, 284.
C. J. Date, "An Introduction to Database Systems" (1986), Chapter 18 (pp. 413-436).
Donald E. Knuth, *The Art of Computer Programming*, Second Edition, vol. 1, Fundamental Algorithms (1973), pp. 240-259.

*IBM Data Processing Glossary*, Sixth Edition (Oct. 1977) (GC20-1699-5).
*CICS Inter-Communication Facilities Guide*, Nov. 1965.
Harvey M. Deitel, *An Introduction to Operating Systems*, Revised First Edition, 1984.

*Primary Examiner*—Raulfe B. Zache
*Assistant Examiner*—Robert B. Harrell
*Attorney, Agent, or Firm*—Brown, Martin, Haller & Meador

[57] ABSTRACT

A method for providing synchronous message transfer is provided in an asynchronous operating environment in which conversational status can be established between communicating endpoints. The operating environment includes a transaction processing system having a plurality of terminals, a data communication component (DCC), and a transaction processor (XP) which exchanges message data with DCC for transmission to selected terminals. The method steps comprise ascertaining at the DCC whether a transaction initiated by a message is synchronous or asynchronous; passing the ascertained transaction from the DCC to the XP for generating a response; and processing the responses to synchronous transactions in progress, while retaining the responses to asynchronous transactions until the synchronous responses are completed. A stored variable data object for each terminal includes a field for indicating when a synchronous transaction is in progress and a field for identifying the input message initiating the synchronous transaction. Messages received from a terminal are inspected to determine their destination processes. When a message destined for a synchronous process is received from a terminal, entry is made into the synchronous field of the terminal's associated data object and an identification associated with the message is entered into the object's message ID field. When the synchronous flag is set in the terminal's associated data object, transaction responses directed to the terminal are inspected to ascertain which constitutes the synchronous response. All asynchronous responses for the terminal are buffered until the synchronous response is identified and processed for transmission to the terminal.

5 Claims, 3 Drawing Sheets

METHOD OF PROVIDING SYNCHRONOUS MESSAGE EXCHANGE IN AN ASYNCHRONOUS OPERATING ENVIRONMENT

BACKGROUND OF THE INVENTION

This invention relates to asynchronously-operating systems in which synchronous processes can be selectively invoked. More particularly, the invention relates to an asynchronous transaction processing system which also supports the selective invocation of synchronous transaction processes.

Transaction processing characteristically involves a system in which a central transaction processor (XP) is connected, on a time sharing basis, to a multiplicity of user terminals which access the transaction processor for the purpose of conducting transactions Relatedly, a transaction is an exchange between a terminal and the transaction processor that accomplishes a particular action or result. For example, in banking transaction systems, an automatic teller (user terminal) may be used to effect the withdrawal of funds from a customer's account and the updating of the customer's account balance to reflect the withdrawal. Transaction processing is covered in detail in Chapter 18 of the work by C. J. Date entitled "AN INTRODUCTION TO DATA-BASE SYSTEMS, VOLUME ONE," Addison-Wesley, 1986.

A transaction necessarily involves an application process in the transaction processor which is dispatched to conduct a transaction in response to input data provided by a message from a user. As with any other computer process, an application process involved in a transaction consists of receiving the input, processing the input, and generating an output signifying the transaction response to the input. In an on-line multi-terminal transaction processing system, a system user engages in a transaction by inputting data into the system directly from one of the terminals connected, through a communication node, to the transaction processor. The response is transmitted from the processor back to the point of origin of the input data.

In a synchronous environment, after inputting transaction data, a terminal is "held" by the application program conducting the transaction while the transaction processing is performed, and is released when the response is transmitted to the terminal. A terminal is "released" by transmission to the terminal of a release message containing a code which unlocks the terminal keyboard at the terminal and restores the terminal to an unused ready condition, thereby permitting the user to enter other messages. In an asynchronous environment, the terminal may be released before the response to the originally-initiated transaction is received. If the transaction requires synchronism, preferably the terminal is not released until the response is generated; then, the terminal release and the transaction response are transmitted simultaneously.

Frequently, a synchronous transaction involves a conversational mode of operation in which a sequence of alternating entries and responses between the terminal user and the transaction processor takes place. In a conversational transaction, a terminal should be held by the executing application program until all of the entry/response iterations are completed. When released, the terminal is free to initiate another transaction.

If the terminal is engaged in an asynchronous transaction, the application program can release it prior to input processing and response generation. When released, a terminal can initiate another transaction, await the response of the current transaction, or view responses from other transactions which are queued for output to the terminal. Thus, asynchronism in the transaction processing context means essentially that, once a terminal is used to initiate a transaction, it is disconnected from the transaction executing process. While the transaction processor is provided with a means for returning the response to the terminal, other response data from various sources may also be generated for transmission to the terminal in a nonpredictable sequence.

It is known that an on-line transaction processing system can operate to selectively provide a terminal user with either synchronous or asynchronous connection to an application program. Such selection is normally an artifact of initiating a transaction supported by one of two or more independent subsystems in the transaction processor. For example, a transaction processor can include a pair of database management systems (DBMS) such as the customer information control system (CICS) and information management system (IMS), both software products available from IBM, Armonk, N.Y. As is known, the transactional complement of the IMS includes both synchronous and asynchronous transactions, while the CICS supports only synchronous transactions.

Synchronous transactions are normally used for high priority, short-duration processes. For example, a terminal user may wish to retrieve or update a particular record in a file.

Asynchronous transactions are best suited for low priority, long-duration process where the retention of the terminal until response is delivered would result in inefficient operation. An example of this type is a request that may retrieve a large number of records for inspection, select some subset based on user specified criteria, sort the subset in a user specified sequence, route the list to a device for printing, and respond to the requestor when the list had completed printing.

In a transaction processing system supporting both synchronous and asynchronous transaction processing, it is desirable to permit a user to initiate concurrent execution of synchronous and asynchronous processes. This will permit a user to initiate one or more long-term (asynchronous) processes and, while awaiting a result from the processes, initiate synchronous processes in order to make more effective use of on-line time.

The implementation of a transaction facility compounding synchronism and asynchronism most frequently takes place in the context of a transaction processor controlled by an asynchronous operating system. The multiple virtual storage (MVS) system available from IBM is the principal example of such an operating system. MVS is a multiprogramming operating system which can support the concurrent execution of a variable number of transaction processes. When a message is received from a terminal, it is edited as necessary and the required transaction function is identified. At the same time, the terminal is released to perform more input operations or to receive output transmissions from the transaction processor. As input from the terminal is processed and responses generated, control of the terminal may be reacquired for transmission of the responses. Such a mode of operation is necessary to support the asynchronous IMS functions, message switching, bulk data transfer, printer spooling, and other such asynchronous applications.

For interactive synchronous operations, the desired effect is to initiate the transaction, have it processed, and receive the response before continuing with the next operation. In an asynchronous operating environment, it is possible for a user to enter a synchronous request and then, before the response is generated, receive a message from a different, asynchronous process such as a message switch from another terminal or the reply from a prior asynchronous transaction. This has the appearance of a wrong answer to a request and may be confusing to an inexperienced system user. Another disadvantage of the asynchronous method of system operation occurs when an asynchronous transaction requires a long time to respond. An impatient operator may enter a request and, while awaiting a tardy reply, reenter it one or more times. Since the terminal is released in the asynchronous environment, a sequence of substantially identical transactions is conducted which can lead to improper data update and confusion of a user as the identical replies are displayed in a corresponding response sequence.

Solutions to the problem of providing for synchronous transaction processing in an asynchronous operating environment exist in the prior art. For example, U.S. Pat. No. 4,410,940 of Carlson et al. describes a method permitting cooperating sequential processes to pass control among themselves as they progress to termination. Such passage of control is founded upon a prior knownledge of process input and cannot accommodate the random arrival order of transactions.

Another method of imposing synchronism on an essentially asynchronous operating system is known as "bracket protocol." A bracket is treated by an asynchronous operating system as defining an uninterruptable unit of work consisting of one or more input/response exchanges between the transaction processor and a terminal. The first input of the first exchange in the unit includes a header that indicates "begin bracket," and the final output indicates "end bracket." Essentially, acceptance of the "begin bracket" locks the communication path between the terminal and the transaction processor and imposes a DEMAND/RESPONSE protocol to a transaction until the end bracket occurs. In this regard, the bracket control is also a form of input management in that it prevents the execution of any other transaction processes until the final bracket releases the lock. Further, since the bracket method is terminal-oriented, it requires either that extra intelligence be provided to a terminal or that a user have the level of skill necessary to use the method.

In view of the increasing mixture of synchronous and asynchronous processes in transaction processors which include asynchronous operating systems, there is an obvious need for a technique that provides an effective means for supporting synchronous transactions without preventing concurrent completion of executing asynchronous transactions. It is evident that the self-scheduling and bracket techniques of the prior art are not equipped to meet this need.

SUMMARY OF THE INVENTION

The present invention fully satisfies the stated need of supporting synchronous transaction processing in an asynchronously-operated transaction processing environment without surrendering the opportunity to permit completion of executing asynchronous transactions concurrently with the synchronous transaction by buffering the responses to executing asynchronous processes generated for a given terminal until a concurrent synchronous process initiated by the terminal has completed. The invention is founded on the critical observation that concurrency among synchronous and asynchronous processes can be maintained by relating responses to specific inputs and scheduling process of responses rather than inputs. This permits a system to concurrently execute synchronous and asynchronous transactions for the same terminal without requiring added intelligence at the terminal or a particular level of skill in the user. This is accomplished by embodiment of the invention in a method for establishing and maintaining a conversational status among communicating end points in a transaction processing system that includes a plurality of terminals, a data communication component (DCC), and a transaction processor (XP) which exchanges transaction data in the form of messages with the DCC for transmission to selected terminals. The method compounds the steps of ascertaining, at the DCC, whether a transaction initiated by a message generated at a terminal and forwarded to the XP through the DCC is synchronous or asynchronous, passing the ascertained transaction from the DCC to the XP for generation of a response, and processing the responses to synchronous transactions in progress while buffering the responses to asynchronous transactions until the synchronous responses are extinguished.

Alternatively, the invention is embodied as a method for synchronous transaction processing in an asynchronously operated transaction processing system in which a plurality of terminals exchange messages with a transaction processor (XP) through a data communication component (DCC), the processor including plural application processes which support terminal-initiated transactions by generating responses to message-borne transaction codes. In the first step of the method, it is ascertained at the DCC whether a message from a terminal will initiate a transaction which is synchronous or asynchronous. Next, when a transaction is determined to be synchronous, execution takes place against a data object associated with the terminal to provide an indication of the synchronous transaction; then, the ascertained transactions are passed to the XP from the DCC for generation of responses. In reaction to each response generated for the terminal by the XP, the data object is examined to ascertain whether a synchronous transaction has been initiated and, if a synchronous transaction has been initiated, the method contemplates passing only a response included in the synchronous transaction to the DCC for transmission to the terminal and buffering all other responses for transmission to the terminal after completion of the synchronous transaction. Otherwise, the response is passed to the DCC for transmission to the terminal.

It is therefore an object of this invention to provide for establishment and maintenance of a synchronous transaction between a terminal and a transaction processor which does not prevent the completion of concurrently-executing asynchronous transactions involving the terminal and the processor.

This object and other objects and attendant advantages of the invention will become more apparent when the detailed description of the invention is read with reference to the figures.

DESCRIPTION OF THE PREFERRED EMBODIMENT

Figure 1:
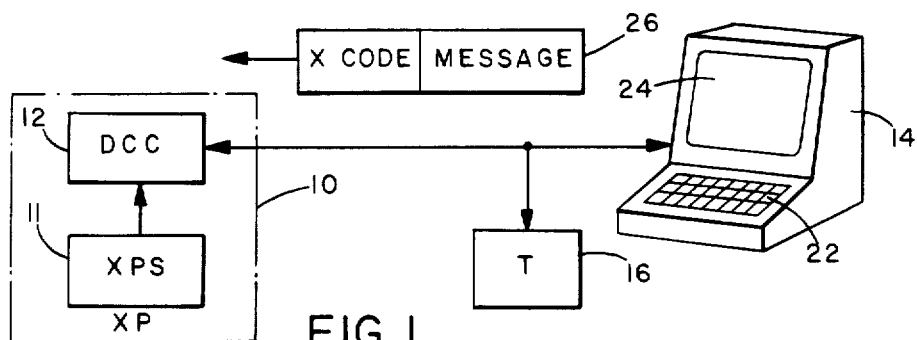
FIG. 1 is an illustration of a multi-terminal transaction processing system including a transaction processor, a transaction processing subsystem, a data communication component, and a representative one of a plurality of terminals.

Referring first to FIG. 1, a transaction processing system is shown comprising at least a transaction processor (XP) 10 (which can comprise a programmed computer), a transaction processing subsystem (XPS) 11, a data communications component (DCC) 12, and a plurality of terminals, two of which are indicated as 14 and 16. As is conventional with multi-terminal systems, the DCC 12 comprises a programmed communication support entity that manages transmission of data between the XP 10 and the terminals. Physical data transmission between the DCC and the terminal can be provided by any number of communication protocols including IBM's System Network Architecture (SNA) and is not directly related to the invention being described.

Data communications between the terminal 14 and the XP 10 are for the purpose of permitting the user of the terminal 14 to conduct transaction processing using the resources of the XP 10 through the data entry and output facilities of the terminal 14. Typically, data entry is supported by a keyboard 22, while output is provided on a display device such as the CRT screen 24.

The user of the terminal initiates, or "enters," a transaction by sending a message having the format indicated by 26. The message 26 includes a transaction code (XCODE) which indicates the transaction process requested and the data which is to be acted upon by that process. The transaction code identifies to the XP 10 which application program is to process the message.

The input message is sent by the terminal 14, received by the DCC 12, and, after determining the destination and transaction characteristics, is passed to the XPS 11 for processing.

When the transaction process is completed, the XPS 11 responds to the "entered" transaction by an output message (a "response") to the DCC 12 for transmission to the originating terminal 14.

Figure 2:
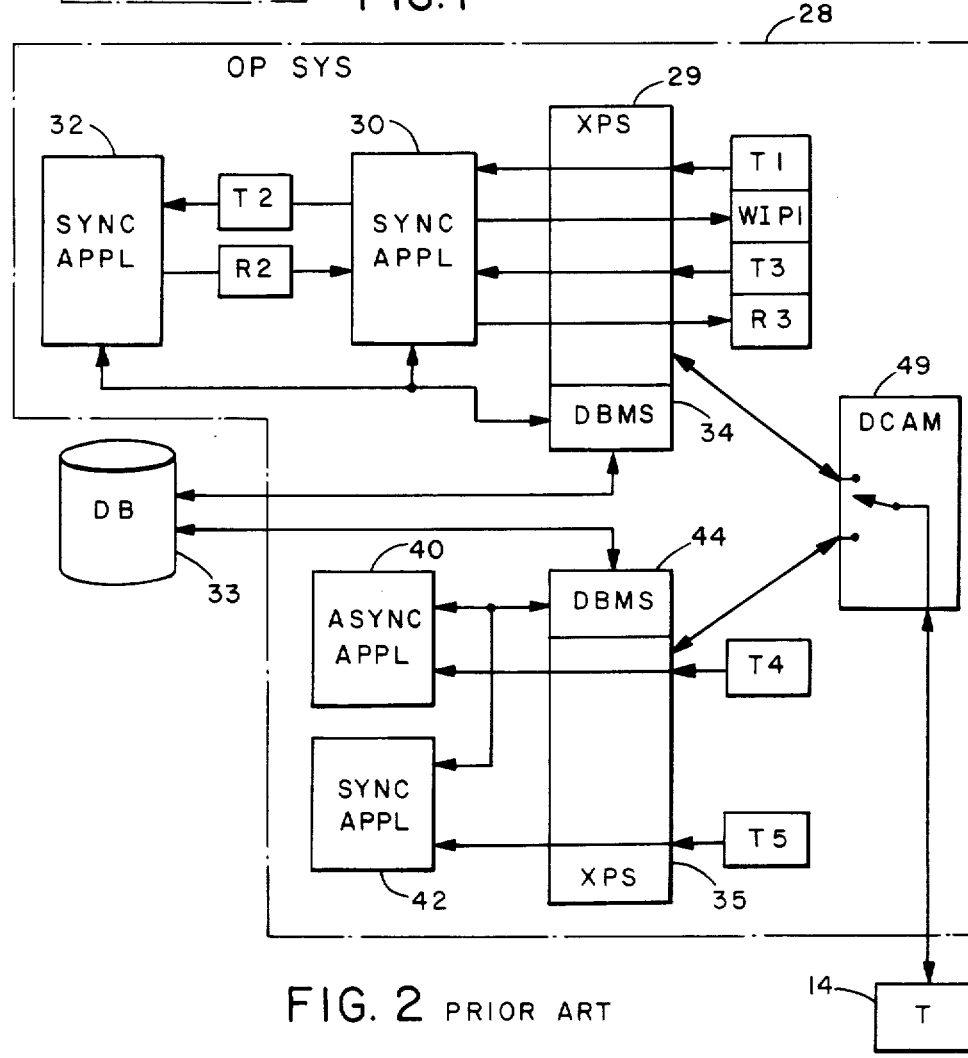
FIG. 2 is a block diagram illustrating the prior art interconnection of a pair of database management systems with a plurality of transaction application programs in the transaction processor of FIG. 1.

Thus described, the system of FIG. 1 forms the application environment in which the invention is intended to be practiced. FIG. 2 illustrates a prior art structure which is understood to constitute operating systems, application, and service entities conventionally entered into the XP 10 as software programs. The structure of FIG. 2 supports both synchronous and asynchronous transaction processing in an asynchronously-operating system. In this regard, the transaction processor of FIG. 1 is understood to be programmed with an asynchronous operating system such as the IBM MVS system. The operating system of the XP 10 is indicated by 28 in FIG. 2. A programmed transaction processing subsystem (XPS) 29, such as the CICS, operates under the control of the operating system 28. Application programs (APP) 30 and 32 are conventionally linked to the operating system 28. It is postulated that the application programs 30 and 32 provide processing support for synchronous transactions carried out against a database (DB) 33 through a database management system (DBMS) 34, which is associated with the XPS 29. In FIG. 2, the XP 10 can also contain a second programmed transaction processing subsystem 35, such as the IMS. The operating system 28 of the XP 10 also controls operation of the XPS 35. Another set of synchronous and asynchronous transactions are supported by application processes 40 and 42, which reference the database 33 by way of a DBMS 44 associated with the XPS 35. As stated above, the IMS does support synchronous and asynchronous transactions executed against a database such as the DB 33.

In the prior art, several techniques are used with varying degrees of success, to permit synchronous and asynchronous transactions to intermix. Most require either application program or terminal operator involvement to produce the desired result.

As is known, a transaction processing subsystem such as CICS XPS 29 or IMS XPS 35 may use a data communications access method (DCAM) 49 such as IBM's ACF/VTAM which supports the establishment of logical connections between a terminal and a transaction processing subsystem under control of the terminal user. Thus, synchronous transactions can be directed to CICS while asynchronous transactions could be directed to IMS under terminal use control.

Thus, when a synchronous transaction is to be entered, the user establishes connection to the XPS 29 and the transactions are processed in a synchronous manner. When an asynchronous process is to be performed, the user disconnects from the XPS 29 and connects to the XPS 35 and enters the transaction(s). While these processes complete, the user may return to XPS 29 and perform other synchronous processes until some later time when connection is reestablished by the user with XPS 35 to interrogate the system as to the status of the asynchronous processes and retrieve the responses of those completed.

Another example of a technique used by a synchronous transaction processing subsystem to provide asynchronous transactions is to perform a series of synchronous operations that simulate the function of an asynchronous operation. Using this technique, a transaction is entered by the user at the terminal 14 which schedules a synchronous application 30. The application 30 initiates a second transaction T2 which causes the scheduling of another synchronous application 32 and responds with a message to the terminal 14 indicating work in process (WIPl), thus completing the initial synchronous transaction T1.

The application program 32 processes the transaction T2 and produces a response R2 for the application program 30. The response R2 is passed to the application program 30 and is saved by the application program 30, thus completing a second synchronous transaction T2.

At some later time the user at terminal 14 enters a subsequent transaction T3 interrogating the status of the prior transaction. The application program 30 retrieves the response saved from the prior transaction T2 and responds to the terminal with a message R3 indicating the result of transaction T2, thus completing the final synchronous transaction T3. Thus, when connected to a synchronous transaction processing environment, an operator may achieve the function of an asynchronous transaction, which is to complete a long running process without restricting the use of the terminal for other work during the process, by utilizing a sequence of three synchronous transactions (for example, T1, T2, and T3).

Conversely, in an asynchronous transaction processing environment, a synchronous result may be achieved when desired using a technique which involves cooperation in the application program. Using this technique, a transaction T4 is entered from a terminal 14 and is determined to require the application program 40, which performs an asynchronous process. Thus, after scheduling the application, the terminal 14 is released to perform other work. At this time the user enters transaction T5 from the terminal 14. This transaction is determined to utilize the application program 42 which performs a synchronous process. Thus the terminal is held awaiting a response from the application.

This process could work with no application involvement as long as the synchronous application program 42 completes prior to the asynchronous application program 40. However, there is no way to ensure this in a multi-tasking environment. Thus, some process must be included to identify the response as the one for which the terminal is waiting. This can be done by an application convention indicating that the response is synchronous or by the recognition by the XPS 35 that the application is synchronous. While this technique works well in a single system environment where recovery/restart is no concern, it does not provide the necessary control where multiple systems are involved or where a system failure is recovered and expected to continue in a relatively transparent manner.

Figure 3:
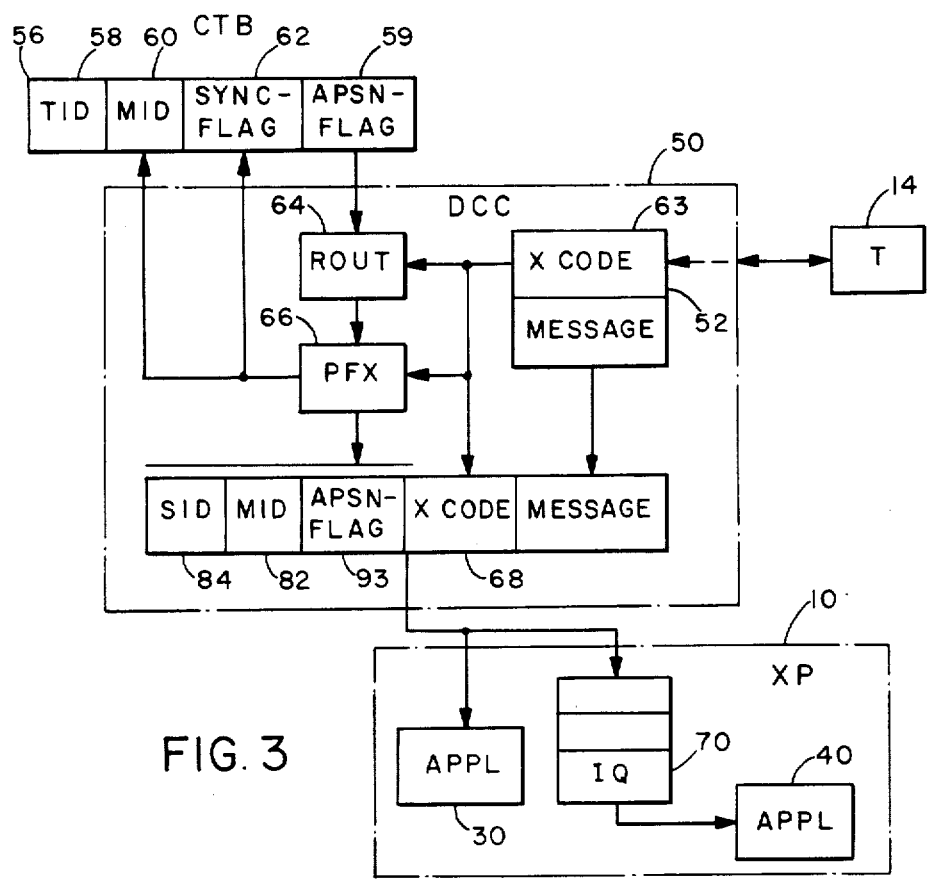
FIG. 3 is a block diagram of an execution module embodying the machine and process structures suitable for implementing a transaction determination step of the invention.
Figure 4:
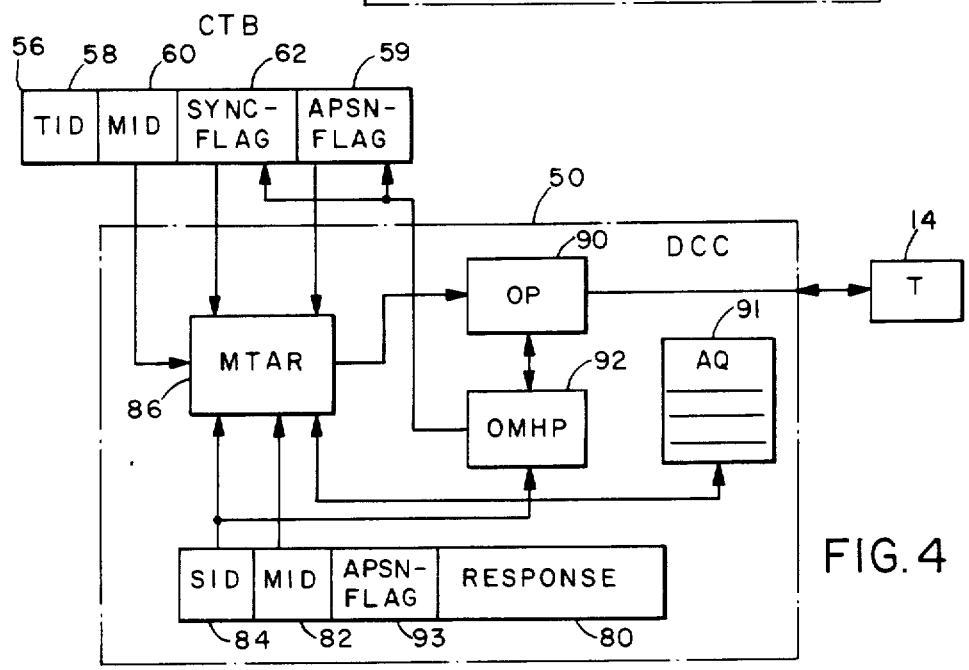
FIG. 4 is a block diagram of the execution module of FIG. 3 which illustrates the machine and process structures and interconnections necessary for processing transaction responses according to the method of the invention.

To provide for synchronous interactive operation in an asynchronously-operating environment, the method of the invention is practiced in the form of an executable process module illustrated in FIGS. 3 and 4 and denoted as a data communication component (DCC) 50. The DCC is functionally positioned between the network and the transaction processing system (XP) 10. Its purpose is to establish and maintain conversational status between system end points such as the terminal 14 and the XP 10 so that a synchronous transaction can be conducted through the terminal 14 without being interrupted by asynchronously-occurring responses from the XP 10 or other communicating end points of the system. This is accomplished without the use of brackets or interprocess scheduling and permits other transactions already initiated from the terminal 14 prior to the synchronous transaction to execute while conversational status is being maintained.

To provide for synchronous interactive operation, transactions in the form of messages received from terminals such as the terminal 14 are examined to ascertain whether they are synchronous or asynchronous. This ascertaining step can be understood with reference to the diagram of FIG. 3. When a message is received from the terminal 14 by the DCC 50, it is placed in a temporary processing storage location 52. The identification of the source terminal 14 is used to access a variable data object denoted as a communication terminal block (CTB) 56. The CTB 56 is a conventional control block which is used by the DCC 50 to hold control information pertinent to the status of the terminal 14. In this regard, each connected terminal of the network has associated with it a unique communication terminal block. In addition to all data necessary to maintain communication status with the terminal 14, the CTB 56 contains four fields pertinent to the functioning of this invention. These are:

the terminal identifier (TID) 58 which contains the name by which the terminal represented by this control block is known to the system;

the application synchronous process flag (APSN-FLAG) 59 which is used to indicate whether the application has requested the continuation of a synchronous operation after response. This is used if a multiple interchange or "conversation" is required to complete a transactional process;

the message identifier (MID) 60 contains a value that is maintained unique for the life of a message. This is accomplished by maintaining an 8-byte field, the first four bytes of which are set to the value of the time of day clock when the system is initiated and thus are always unique for the life of the machine since this clock is never reset. The remaining four bytes are set to 0 at initialization and are thereafter incremented by 1 on the receipt of each the message; and the message synchronous indicator flag (SYNC-FLAG) 62 used to indicate whether a message has currently scheduled a synchronous application or not.

The transaction code (XCODE) field 63 is passed to a message routing routine (ROUT) 64 where the characteristics which were specified for the transaction are analyzed to determine if the message is to be processed by a synchronous or an asynchronous application program and the SYNC-FLAG 62 in the CTB 56 is set accordingly.

A message prefix builder routine (PFX) 66 is then given control to build a header or prefix for the message. This header includes a number of control fields, two of which are used in the implementation of the invention being described. One of these is a message source identifier field (SID) 84 which identifies the terminal from which the message originated. This is obtained by copying the TID 58 from the CTB 56 into the message header. The other is the message identifier (MID) 82 which is a copy of the MID field 60 from the CTB 56 after it has been incremented and restored in the CTB.

After the message prefix has been built, it, along with the message 68, is passed to the transaction processor (XP) 10 for scheduling of the required application program and processing of the message. The DCC 50 then interrogates the SYNC-FLAG 62 field in the CTB 56 to determine if the message in process was synchronous or asynchronous. If the message was synchronous, no more input processing need be done until the response is generated by the application. If the message was asynchronous, however, a control message is generated by conventional means in the DCC 50 to the terminal 14 to release control and permit subsequent data entry.

Message passing from the DCC 50 to one of the application programs is conventional. Relatedly, the compound message 68 with the appended header can be passed directly to the application program 30, for example, or placed in the input message queue (IQ) 70 of the application process 40, depending on the design of the XP 10.

Refer now to FIG. 4 for an understanding of how the DCC 50 processes messages which arrive for the terminal 14. Output messages generated by an application process for provision to the terminal 14 will have appended by the process a copy of the header received with the input message being processed which caused the output to be generated. Thus, the SID and the MID described in the input process above is duplicated in the message header attached to the output message.

It is possible that the output message is being generated by a process that was initiated by a means other than the arrival of a message from a terminal such as reaching a particular time of day. In this case, the message is, by definition, asynchronous and the message header generated contains binary zero as a message ID (MID) 82 and source ID (SID) 84.

When an output message is generated for the terminal 14, the message is received by the DCC 50, where a message transmission analysis routine (MTAR) 86 receives the message and evaluates it. Evaluation is based on the contents of the source ID (SID) 84, the message ID (MID) 82, and the setting of the communication terminal block (CTB) message synch indicator field (SYNC-FLAG) 62.

When the output message is received for the terminal 14, the identifier of the terminal is used to access the CTB 56. The MTAR 86 inspects the CTB SYNC-FLAG to determine if a synchronous input message has been received and is in process. If not, any output message is valid for transmission to the terminal 14 and an output process (OP) 90 is given control to initiate the transmission.

If a synchronous output message is indicated, the source ID (SID) 84 in the message header is compared to the terminal ID (TID) 58 in the CTB. If they are not equal, the output message cannot be a response to the message in process since it resulted from an input message from a different terminal. It is therefore queued for later transmission on an asynchronous output queue (AQ) 91.

If the SID and TID match, the message ID (MID) 82 in the message header is compared to the message ID (MID) 60 in the CTB to determine if this message is the response to the current message in process or for a prior asynchronous input message. If unequal, the message is not the proper one and is queued on the asynchronous message queue (AQ) 91 for later transmission. If equal, it is validated as the proper response and the output process (OP) 90 is given control to initiate the transmission of the message to the terminal 14.

When the OP 90 is dispatched, it obtains the response message 80 and calls an output message header processing (OMHP) routine 92. The header of the output message 80 is provided to the OMHP 92. The OMHP 92 resets the SYNCH FLAG field 62 in the CTB 56. With this done, the OP 90 detaches the header from the message, formats the message for transmission to the terminal 14, and transmits the message to the terminal 14.

Figure 5:
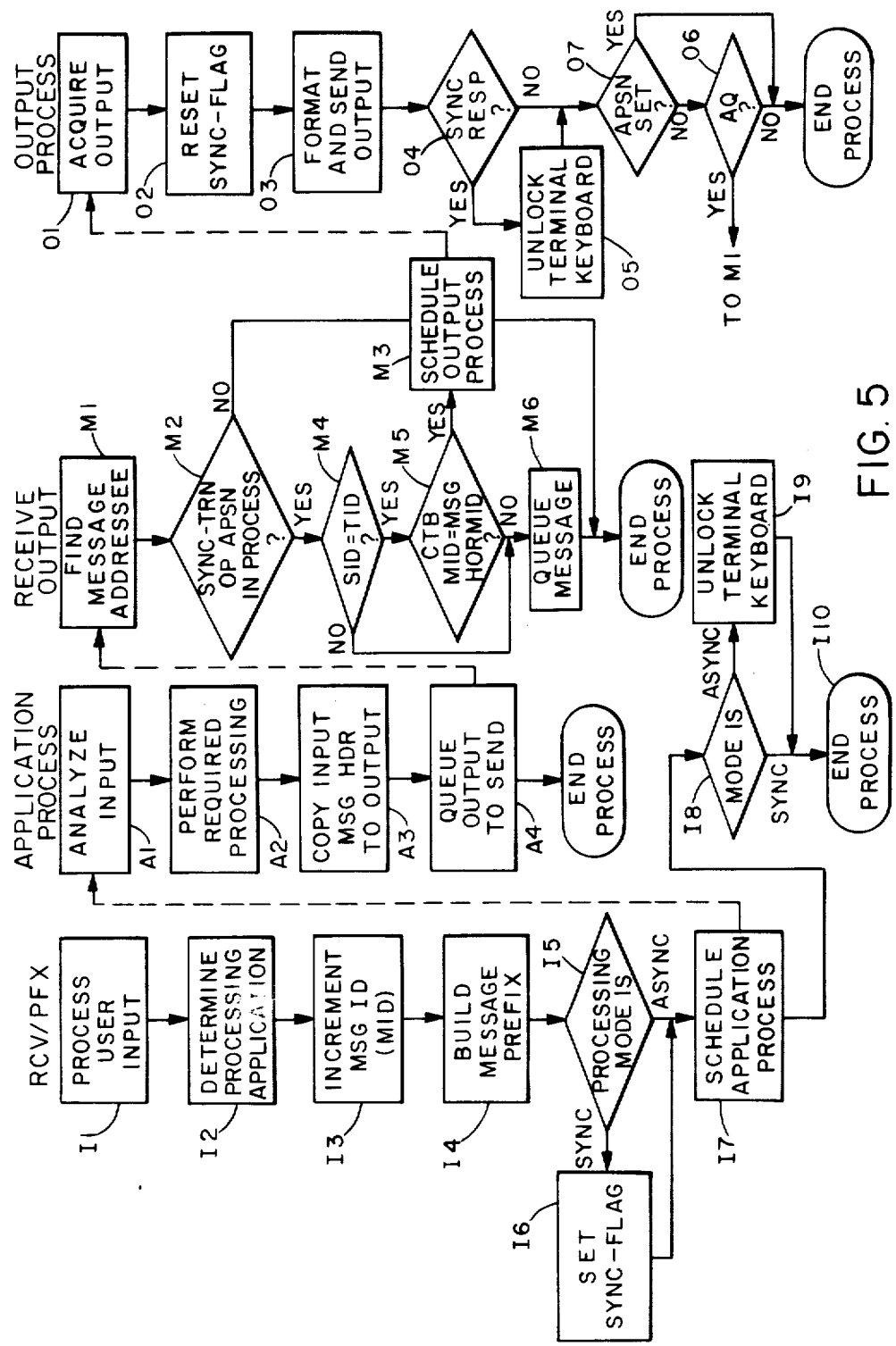
FIG. 5 is a flow chart illustrating the procedures executed in the practice of the method of the invention.

Now, by way of explanation of the operation of the above-described control blocks and modules, the synchronizing protocol of the invention is implemented using the procedure illustrated in FIG. 5. In FIG. 5, the left-hand column illustrates the process for receiving and prefixing (RCV/PFX) input messages, and is therefore understood in conjunction with FIG. 3. In the RCV/PFX process, an input message is received from the user of terminal 14, at which time the input is processed. This is step I1. Next, in step I2, the processing application is determined by examination of the transaction code field 63 of the input message 52 in the routing module 64. Once the transaction code is determined, the PFX module 66, in step I3, increments a message ID (MID) 60 value in the CTB 56 and builds the message prefix consisting of the just-incremented MID value and the source ID (SID). The prefix is appended to the input message 52 in step I4. Next, in decision block I5, the type of processing mode is ascertained. If the processing mode has been determined to be synchronous, the PFX module 66 sets the SYNCH FLAG 62 in step I6 in the CTB 56. If the transaction is asynchronous, the PFX module 66 takes no action against the CTB 56.

Next, in step I7, the application process is scheduled with the operating system of the XP 10. When the application process executes, the input message 52 with the appended header is passed to the application process as the composite message 68. Once the application process is scheduled and the message is passed to the scheduled process, the PFX module 66 terminates the process according to the decision made in step I8. If the transaction mode is synchronous, the process is ended, however the terminal 14 is "held" for the response. On the other hand, if the process is asynchronous, a message is sent by the DCC 50 to the terminal 14, freeing the terminal and unlocking its keyboard and the process is then ended.

The steps of an application process with respect to the input message passed to it are summarized in the column of FIG. 5 under the heading APPLICATION PROCESS. When the application process receives the composite message 68, it (in step A1) determines from the XCODE field and any other data included in the message what processing is required by the indicated transaction. In step A2, the processing is performed, a result is generated, and an output message is built. In building the output message, the application process in step A3 copies the input message header to the output message, giving it the form indicated by reference numeral 80 in FIG. 4. In step A4, output message assembled by the application process is scheduled for submission to the DCC 50 for further processing.

The process steps executed by the DCC 50 in response to receipt of an output message from an application process are summarized under the two columns of FIG. 5 headed RECEIVE OUTPUT and OUTPUT PROCESS, which are understood with reference also to FIG. 4. First, at step M1 in the RECEIVE OUTPUT column, when the output message 80 is received, the identifier of the terminal to which the message is being routed is used to access the CTB for that terminal. The MTAR 86, in step M2, inspects the CTB SYNC-FLAG to determine if a synchronous message has been received and is in process. If not, any message is valid for transmission and the output process is given control to initiate the transmission in step M3.

In step M4, if a synchronous message is indicated, the source ID (SID) in the message header is compared to the terminal ID (TID) in the CTB. If they are not equal, the output message cannot be a response to the message in process since it resulted from an input message from a different terminal. It is therefore queued for later transmission on the asynchronous output queue in step M6.

If the SID and TID match, step M5 compares the message ID (MID) in the message header to the message ID (MID) in the CTB to determine if this message is the response to the current message in process or for a prior asynchronous input message. If unequal, the message is not the proper one and is queued in step M6 on the asynchronous message queue (AQ) 91 for later transmission. If equal, it has been validated as the proper response and the output process (OP) is given control to initiate the transmission in step M3.

With reference now to the OUTPUT PROCESS column of FIG. 5, assume, first, that the MTAR 86 has dispatched the output process OP 90 to send a synchronous response to the terminal 14 and that there may or may not be messages in the AQ 91. First, the OP 90, in step 01, acquires the physical output resources required to send the message. Next, the SYNCH FLAG 62 in the CTB 56 (step 02) is reset and the APSN 57 is set if the message header APSN flag is set 93. In step 03, formatting of the message 80 is performed and the OP 90 causes the message to be transmitted to the terminal 14. If (step 04) the output message is a synchronous transaction response, the terminal 14 is freed by unlocking its keyboard in step 05. Next, the CTB APSN flag 57 is checked (step 07) to determine if the application program is maintaining synchronization. If so, asynchronous messages which are queued for delivery are not eligible for transmission so the process ends. If not set, the AQ 91 is inspected (step 06) to determine if asynchronous messages are available for transmission. If there is at least one message in the queue, the OMHP 92 dispatches the MTAR 86, which obtains the message from the queue and follows the procedure described above. Each time the OMHP 92 executes, its final transaction consists of an inspection of the AQ 91. When the AQ is emptied, the OUTPUT PROCESS is ended without a return to the RECEIVE OUTPUT process.

Referring once again to FIGS. 3 and 4, the invention also provides a means for enabling an application process to maintain synchronicity with a terminal. This would be desirable when multiple interactions between the terminal and application are necessary to complete a process. In this regard, the input processing represented by FIG. 3 will result in the MID and SYNCH FLAG fields 60 and 62 of the CTB 56 being set and the message passed to an application process. Now, assuming the application process requires additional information from the terminal to complete the transaction, the output message header 80 of FIG. 4 will include the setting of an application SYNCH FLAG (APSN FLAG) field 93. This field is set in the CTB 56 as field 59. In the invention, the APSN FLAG field, when zeroed, indicates that the application process is not maintaining synchronization. The MTAR 86 and OMHP 92 will interpret a non-zero APSN field as an indication by the process that synchronism is to be maintained. The value of the application synchronization flag field 93 will be placed in the corresponding field 59 of the CTB by the OMHP 92 when the message is scheduled for retransmission to the terminal 14. It is postulated that the input message from the terminal 14 which is responsive to an output message with a non-zero value in the field 93 need have no transaction code. The routing module 64 of FIG. 3 inspects the field 59 of the CTB 56 and, if the field is non-zero, the routing function 64 takes the action described above for a synchronous input message by setting the SYNCH FLAG 62, appending a header to the message, and putting the message ID in the MID field 60. In the preferred embodiment, the field 59, if non-zero, contains a transaction code identifying the process to which the message is to be forwarded. When the message is forwarded, the field 59 is once again zeroed.

Procedures for implementing the invention are given in Tables I, II, and III. As will be apparent to the practitioner, these are pseudo code representations which, together with the accompanying description, will enable those skilled in the art to generate, without undue experimentation, the necessary machine-executable instructions to operate an asynchronous processing system according to the method of the invention. In these tables, the right-hand reference numbers correspond to identically-labelled steps in the flow diagram of FIG. 5.

TABLE I
RECEIPT OF INPUT

| | |
|---|---|
| RECEIVE INPUT | 11 |
| DETERMINE SOURCE TERMINAL (LOOKUP CTB) | 11 |
| EXTRACT XCODE | 12 |
| DETERMINE APPLICATION PROCESS | 12 |
| INCREMENT MID-IN-CTB | 13 |
| SID = TID | 14 |
| HDR-MID = CTB-MID | 14 |
| IF APPL-CHARACTERISTIC = SYNCH THEN | 15 |
|   SET CTB-SYNC-FLAG = ON | 16 |
| ELSE | |
| SCHEDULE APPLICATION | 17 |
| IF CTB-SYNC-FLAG = OFF THEN | R8 |
|   SEND TERMINAL UNLOCK | R9 |
| ELSE | |
| END PROCESS | |

TABLE II
RECEIPT OF OUPUT

| | |
|---|---|
| LOOKUP CTB FOR OUTPUT MESSAGE | M1 |
| IF CTB-SYNC-FLAG = OFF THEN | M2 |
|   IF HDR-APSN-FLAG = OFF THEN | M2 |
|     SCHEDULE OUTPUT PROCESS | M3 |
|   ELSE | |
| ELSE | |
| IF CTB-TID = HDR-SID THEN | M4 |
|   IF CTB-MID = HDR-MID THEN | M5 |
|     SCHEDULE OUTPUT PROCESS | M3 |
|   ELSE | |
| ELSE | |
| QUEUE MESSAGE IN ASYNC QUEUE | M6 |
| END PROCESS | |

TABLE III
PROCESS OUTPUT

| | |
|---|---|
| GET OUTPUT | 01 |
| FORMAT OUTPUT | 03 |
| SEND OUTPUT TO DESTINATION TERMINAL | 03 |
| IF CTB-SYNC-FLAG = ON THEN | 04 |
|   SEND UNLOCK TO TERMINAL | 05 |
| ELSE | |
| CTB-SYNC-FLAG = OFF | 02 |
| CTB-APSN-FLAG = HDR-APSN-FLAG | 02 |
| IF HDR-APSN-FLAG = ON THEN | 07 |
|   END PROCESS | |
| ELSE | |
| IF ASY-QUEUE = NULL THEN | 06 |
|   END PROCESS | |
| ELSE | |
| GO TO RECEIVE OUTPUT | |

Obviously, many modifications and variation of the described invention are possible in light of these teachings. Therefore, it is understood that the invention may be practiced otherwise than as specifically described.

We claim:

1. A method for establishing and maintaining conversational status among communicating endpoints in a transaction processing system, said system including a plurality of terminals, a data communication component (DCC) connected to the terminals, and a transaction processor (XP) for exchanging message data with the DCC for transmission to selected terminals, comprising the steps of:

ascertaining, at the DCC, whether a transaction initiated by a message produced at a terminal and forwarded to the XP through the DCC is synchronous or asynchronous;

passing said transaction from the DCC to the XP for generation of a response; and processing responses to synchronous transactions in progress while buffering responses to asynchronous transactions until said responses to said synchronous transactions are completed.

2. The method of claim 1 wherein said processing and buffering step includes, for each response:

identifying a terminal to which said response is to be transmitted;

ascertaining whether said response has been generated as a result of a synchronous transaction initiated by said terminal; and passing said response to said DCC for transmission to said terminal before transmission of another response to said terminal if said response has been generated as a result of a synchronous transaction; otherwise queuing said response to said DCC for transmission to said terminal after transmission of a response generated as a result of any in-process synchronous transaction.

3. A method for synchronous transaction processing in an asynchronously-operated transaction processing system in which a plurality of terminals exchange messages with a transaction processor (XP) through a data communication component (DCC), said XP including plural application processes which support terminal-initiated transactions by generating responses to message-borne transaction codes, comprising the steps of:

ascertaining at the DCC whether a message from a terminal will initiate a transaction which is synchronous or asynchronous;

when a transaction is determined to be synchronous, executing against a data object associated with said terminal to provide an indication in said data object of said synchronous transaction;

passing messages received from said terminal to the XP from the DCC for initiating transactions;

generating responses for said transactions in the XP; and in reaction to each response generated for said terminal by the XP;

examining said data object to ascertain whether a synchronous transaction has been initiated; and if a synchronous transaction has been initiated, transmitting only a response included in said synchronous transaction to said terminal, and buffering all other responses for transmission to said terminal until said synchronous transaction is completed; otherwise transmitting said responses to said terminal.

4. The method of claim 3, wherein said buffering includes placing said other responses in an asynchronous message queue.

5. The method of claim 4 further including, after transmitting any response, inspecting said asynchronous message queue and, if said asynchronous message queue contains at least one response, dequeuing and transmitting a response from said asynchronous message queue.

* * * * *

UNITED STATES PATENT AND TRADEMARK OFFICE
CERTIFICATE OF CORRECTION

PATENT NO. : 4,823,304

DATED : April 18, 1989

INVENTOR(S) : FRANTZ ET AL

It is certified that error appears in the above-identified patent and that said Letters Patent is hereby corrected as shown below:

Title page:

[73] ASSIGNEE: INTERNATIONAL BUSINESS MACHINES CORPORATION, Armonk, N.Y.

Signed and Sealed this

Nineteenth Day of December, 1989

Attest:

JEFFREY M. SAMUELS

Attesting Officer          Acting Commissioner of Patents and Trademarks